United States Patent [19]
Kunkel et al.

[11] Patent Number: 4,983,101
[45] Date of Patent: Jan. 8, 1991

[54] DRIVE MECHANISM FOR PUMPS

[75] Inventors: Heinrich Kunkel; Armin Olschewski, both of Schweinfurt, Fed. Rep. of Germany

[73] Assignee: SKF GmbH, Schweinfurt, Fed. Rep. of Germany

[21] Appl. No.: 387,493

[22] Filed: Jul. 24, 1989

[30] Foreign Application Priority Data

Jul. 28, 1988 [DE] Fed. Rep. of Germany ....... 3825632

[51] Int. Cl.$^5$ ............................................... F04B 9/02
[52] U.S. Cl. .................................. 417/362; 123/41.44; 417/364
[58] Field of Search ..................... 123/41.44; 417/362, 417/364; 474/101, 113, 114

[56] References Cited
U.S. PATENT DOCUMENTS 3,934,966  1/1976  Asberg .................. 123/41.44 X
4,911,610  3/1990  Olschewski et al. .

FOREIGN PATENT DOCUMENTS 2591299  6/1987  France .................. 123/41.44

Primary Examiner—Gerald A. Michalsky
Attorney, Agent, or Firm—Eugene E. Renz, Jr.

[57] ABSTRACT

Drive mechanism for pumps, including a pump rotor mounted in a pump chamber, a pump cover covering the pump chamber. The cover has an axially projecting shoulder with a housing bore passing through from the pump rotor to the outside, and a shaft passing through the housing bore. The shaft is connected in a torsion-proof manner at its inner end to the pump rotor and at its outer end by way of a coupling element to a drive wheel. The shaft is supported in an inner bearing seated in the housing bore while the drive wheel is supported on an external bearing. A plate 7 is provided, which is separate from the pump cover 5 and which can be mounted on the housing or the like in various positions. The bearing 9 for the drive wheel 10 is supported on the plate 7 in a manner to allow freedom of rotation.

7 Claims, 3 Drawing Sheets

DRIVE MECHANISM FOR PUMPS

FIELD OF THE INVENTION

The present invention relates to drive mechanisms for pumps.

BACKGROUND OF THE INVENTION

Drive mechanisms of the general type to which the present invention relate are not new per se. These drive mechanisms typically comprise a pump rotor mounted in a pump chamber which is surrounded by a pump cover having an axially projecting shoulder end having a bore for the pump rotor. A shaft is connected at its inner end to the pump rotor and by a coupling element to the drive wheel, the shaft being supported in an inner bearing seated in the housing bore, while the drive wheel is supported in an external bearing. In accordance with a prior known mechanism of the type shown in West German Patent Application No. 3 716 098.2, the inner ring of the outer bearing providing the radial and axial support is seated on a cylindrical lateral surface section of the axially projecting shoulder of the pump cover.

The drive mechanism described above has several disadvantages and drawbacks. For example, in the design shown in the West Germany application, there is a frequent need to tension the drive belt by means of an eccentric adjustment of the drive wheel which is rather awkward and difficult to do. For example, when the drive wheel is shifted by adjusting the pump cover after the appropriate mounting screws have been loosened, the shaft is also shifted eccentrically along with the pump rotor. In other words, the pump rotor runs eccentrically in the pump chamber which creates problems with the seals and is instrumental in detracting from peak performance. Furthermore, there is only a limited range of eccentricity available for adjustments.

SUMMARY OF THE INVENTION

With the foregoing in mind, it is an object of the present invention to provide an improved drive mechanism for pumps characterized by novel features of construction and arrangement whereby the drive wheel can be shifted to a greater extent without displacing the shaft carrying the pump rotor. To this end, in accordance with the present invention, a separable plate member is mounted on the housing in various predetermined selected positions. The bearing for the drive wheel is supported on the plate member in a manner to provide freedom of rotation. By this arrangement, the drive wheel can be shifted without an acccompanying change in the position of the shaft carrying the pump rotor. This is accomplished rather easily by shifting the plate member which carries the outer bearing and with it the drive wheel whereas the pump cover which supports the shaft carrying the pump rotor remains in exactly the same position. The pump rotor, therefore, always rotates in the center of the pump chamber.

In accordance with another feature of the present invention, the plate member has a sleeve-like peripheral shoulder in which the bearing for the drive wheel is supported. This sleeve-like shoulder of the adjustable plate member surrounds the axially projecting parts of the pump cover and the shaft carrying the pump rotor. Consequently the drive mechanism has a very compact design.

In accordance with still another feature of the present invention, new and improved coupling means is provided for transmitting the drive force from the drive wheel to the shaft carrying the pump rotor. This novel coupling arrangement is designed as a carrier attached to the shaft having a plurality of projections in the form of tongues extending about its periphery which are adapted to drivingly engage in corresponding recesses in the drive wheel. The carrier can be made as an integral part of the shaft or as a separate part.

In accordance with still another feature of the present invention, the carrier can be designed in the form of a cup having a ring-shaped projection in the center for setting on to the shaft and projections distributed about the outer periphery for engaging in the recesses in the drive wheel. The complementary projections and recesses are designed in such a way that they can be shifted in a radial direction when the drive wheel is adjusted without any effect whatsoever on the engagement and transmission of the torque.

In accordance with an additional feature of the present invention, the radial recesses can be provided in a ring connected in a torsion-proof way to the drive wheel.

In accordance with still another feature of the present invention, a seal means is provided for sealing off the drive wheel on a side thereof facing away from the pump rotor by means of a cover disk.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
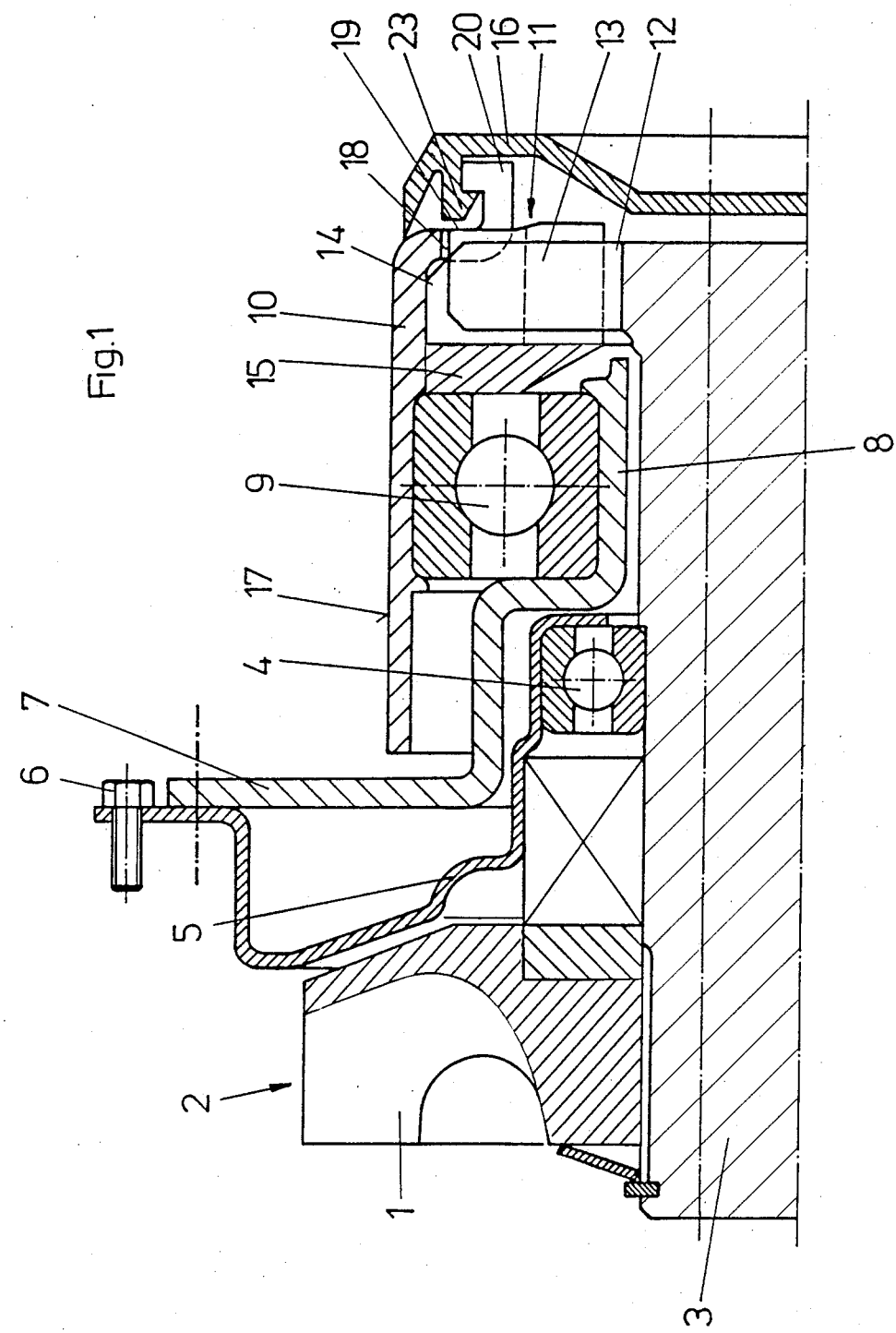
FIG. 1 is a fragmentary sectional view showing a drive mechanism in accordance with the present invention.

Referring now to the drawings, and particularly to FIG. 1 thereof, there is shown a drive mechanism for a water pump to cool an internal combustion engine (not shown). The drive mechanism includes a pump rotor 1 housed in a pump chamber 2 of an engine block of the internal combustion engine. Pump rotor 1 is seated on a shaft 3 supported by means of an inner bearing 4 in pump cover 5 which is attached by means of mounting screws 6 to the engine block. A plate 7 having a sleeve-like shoulder 8 is attached by means of mounting screws (not shown) to the engine block or pump cover 5. The outer bearing 9 for drive wheel 10 is supported on this sleeve-like extension 8.

Drive means in the form of a coupling element 11 transmits a drive moment to rotor 1. The coupling element is located between the shaft 3 and drive wheel 10 and as illustrated, is designed as a carrier 12 forming an integral part of the shaft of the pump rotor drive shaft 3. Carrier 12 has a plurality of radially outwardly directed projections 13 on its outer periphery which engage in complementary recesses 14 in a ring 15 connected in a torsion-proof way to drive wheel 10. The projections 13 and complementary recesses 14 are designed in such a way that they can be shifted radially relative to one another and maintain engagement.

As best illustrated in FIG. 1, a cover disk 16 on the side opposite the pump rotor 1 seals the drive wheel 10.

Consider now the operation of the drive mechanism of the present invention in terms of its function to tension the drive belt. Accordingly, when it is necessary to adjust the drive wheel 10 to tension the drive belt running on its lateral surface (not shown), the appropriate mounting screws are loosened and then the plate 7 and drive wheel 10 supported thereon can be shifted. Once shifted to tension the drive belt, the screws are tightened again to secure that adjusted position. Consequently, projections 13 of carrier 12 shift in recesses 14 of ring 15, which are connected in a torsion-proof manner to the drive wheel 10.

Figure 2:
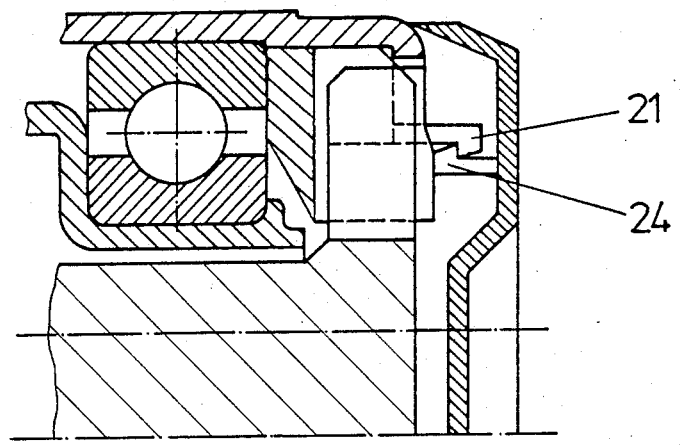
FIG. 2 is a fragmentary, enlarged sectional view similar to FIG. 1 showing a variation of the drive mechanism.
Figure 3:
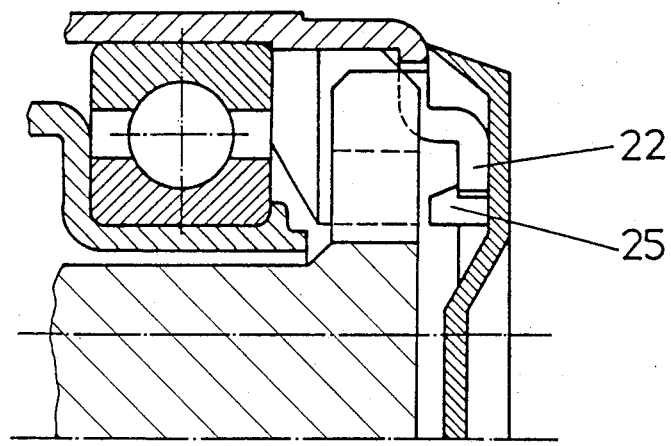
FIG. 3 is a fragmentary sectional view of a modified embodiment of drive mechanism in accordance with the present inventions.

In order to insure that the shaft supporting pump rotor 1 is reliably driven, drive wheel 10 has a radially inwardly directed flange 18 in the area of the projections 13 of carrier 12. This is best illustrated in FIGS. 1-3. The flange 18 has a number of openings 19 corresponding to the recesses 14. The free end of the flange 18 is provided with a hook-like projections 20, 21, 22 which interact and grip complementary hook-like projections 23, 24, 25 of cover disk 16 to hold it in place.

Figure 4:
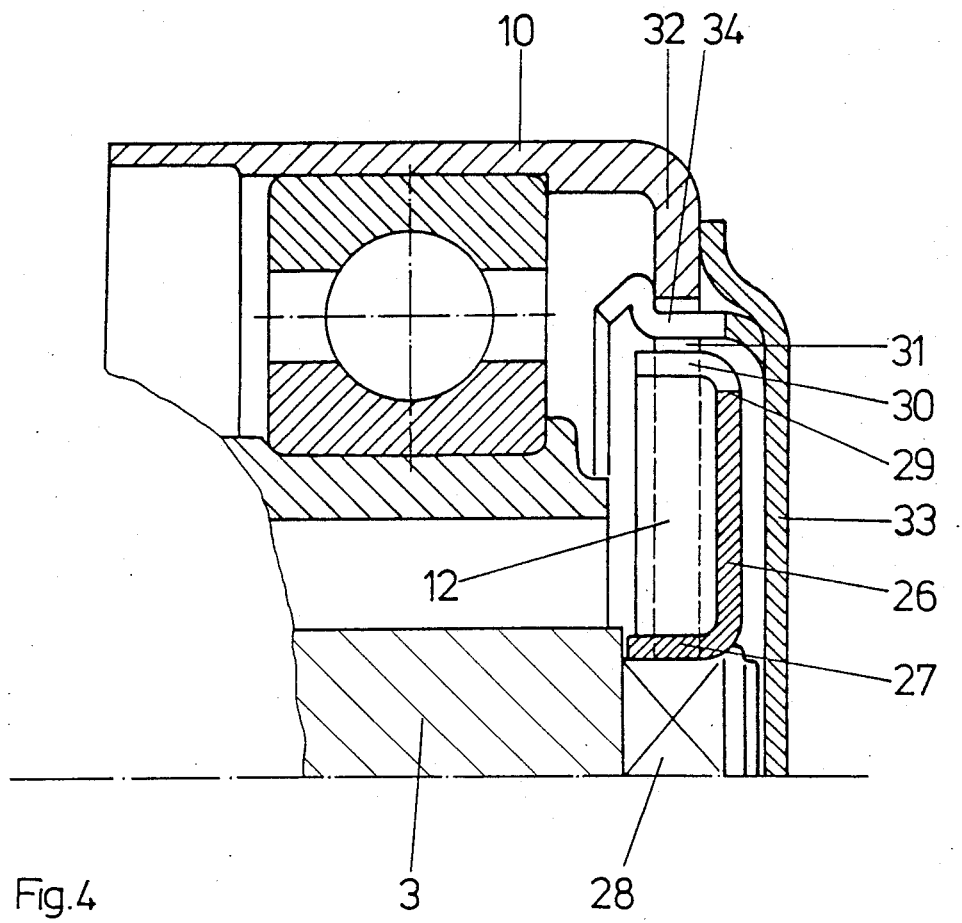
FIG. 4 is still another modified version of drive mechanism in accordance with the present invention.

FIG. 4 shows a modified embodiment of drive mechanism in accordance with the present invention. In accordance with this embodiment, the carrier 12 is designed as a cup 26 having a ring-shaped projection 27 disposed centrally thereof for engaging the polygonally shaped end 28 of shaft 3. Projections 30 are provided on the outer edge 29 which are circumferentially spaced about the periphery which engage in recesses 31 in a radially inwardly directed ring shaped flange of the drive wheel 10. Cover disk 33 surrounding the drive wheel 10 is provided with several hook-like projections 34 which grip through recesses 31 to hold cover disk 33 on drive wheel 10.

While particular embodiments of the present invention have been illustrated and described herein, it is not intended to limit the invention and changes and modifications may be made therein within the scope of the following claims.

What is claimed is:

1. Drive mechanism for pumps, including a housing, a pump rotor mounted in a pump chamber of the housing;
    a pump cover (5) covering the pump chamber, the cover having an axially projecting shoulder with a housing bore passing through from the pump rotor to the outside; and
    a shaft passing through the housing bore, the shaft being connected in a torsion-proof manner at its inner end to the pump rotor and at its outer end by way of a coupling element to a drive wheel (10), the shaft being supported in an inner bearing (4) seated in the housing bore and the drive wheel (10) being supported on an outer bearing (9), characterized by a plate (7), which is separate from the pump cover (5) whose location on the housing can be selectively varied in a direction radially of said housing bore and on which the bearing (9) for the drive wheel (10) is supported with freedom to rotate.

2. Drive mechanism according to claim 1, characterized in that the plate 7 is provided with a sleeve-like shoulder 8, on which the bearing 9 for the drive wheel 10 is supported.

3. Drive mechanism according to claim 1, including a coupling element 11 designed as a carrier 12, 26 attachaded to the shaft 3 carrying the pump rotor 1, said carrier engaging by means of projections 13, 30, distributed around its outer periphery in corresponding recesses 14, 19, 31 of the drive wheel 10.

4. Drive mechanism according to claim 3, characterized in that the carrier 12 is designed as an integral part of the shaft 3.

5. Drive mechanism according to claim 3, characterized in that carrier is designed as a cup 26, which has a ring-shaped projection 27 in the center mounted on shaft 3 and projections 30 distributed around its periphery for engaging in the recesses 31 in the drive wheel 10.

6. Drive mechanism according to claim 3, characterized in that the recesses 14 in the drive wheel 10 are in a separate ring 15, which is connected in a torsion-proof manner to the drive wheel 10.

7. Drive mechanism according to claim 1, characterized in that drive wheel 10 is sealed on the side facing away from the pump rotor 1 by a cover disk 16, 33.

* * * * *